_United States Patent [19]_
Fletcher et al.

[11] 3,847,652
[45] Nov. 12, 1974

[54] METHOD OF PREPARING WATER PURIFICATION MEMBRANES

[76] Inventors: James C. Fletcher, Administrator of the National Aeronautics and Space Administration, with respect to an invention of; John R. Hollahan, 760 De Haro St., San Francisco, Calif. 94107; Theodore Wydeven, 1130 Revere Dr., Sunnyvale, Calif. 94087

[22] Filed: Dec. 8, 1972

[21] Appl. No.: 313,389

[52] U. S. Cl. ............. 117/93.1 GD, 117/161 UA, 117/161 UN, 117/161 UZ, 204/177, 210/500, 264/22, 264/217
[51] Int. Cl. .......... C08f 1/22, C08f 3/34, C08f 3/00
[58] Field of Search. 117/93.1 GD, 106 R, 161 UA, 117/161 UZ, 161 UN; 204/177, 159.22, 160.1; 264/22, 41, 49, 217; 210/500

[56] References Cited
UNITED STATES PATENTS

| | | | |
|---|---|---|---|
| 3,518,108 | 6/1970 | Heiss et al. ................. | 117/93.1 G |
| 3,585,118 | 6/1971 | Harada et al. ............... | 204/159.22 |
| 3,619,394 | 11/1971 | Battaerd ..................... | 204/159.22 |
| 3,761,299 | 9/1973 | Lidel ............................ | 117/93.1 R |

Primary Examiner—William D. Martin
Assistant Examiner—John H. Newsome
Attorney, Agent, or Firm—Armand G. Morin, Sr.; Darrell G. Brekke; John R. Manning

[57] ABSTRACT

Allyl amine and chemically related compounds are polymerized as thin films in the presence of a plasma discharge. The monomer compound can be polymerized by itself or in the presence of an additive gas to promote polymerization and act as a carrier. The polymerized films thus produced show outstanding advantages when used as reverse osmosis membranes.

11 Claims, 5 Drawing Figures

METHOD OF PREPARING WATER PURIFICATION MEMBRANES

The invention described herein was made in the performance of work under a NASA contract and is subject to the provisions of Section 305 of the National Aeronautics and Space Act of 1958, Public Law 85-568 (72 Stat. 435; 42 U.S.C. 2457).

SUMMARY OF THE INVENTION

The present invention relates to a polymerization process and a novel product produced by the process consisting of a thin film. The thin film has shown outstanding properties when used as a reverse osmosis membrane, as will later appear in detail, and the invention will largely be described in terms of producing such a reverse osmosis membrane. However, the invention is one of broad applicability and the films made in accordance with the present invention can be used for various purposes.

Reverse osmosis membrane technology has grown dramatically in recent years for the production of fresh water and is particularly important in the purification and reuse of water in space missions. Much research has been applied to the development of new membrane materials and in accordance with the present invention an outstanding membrane has been prepared by plasma chemical synthetic methods which is a radical departure from the synthetic methods heretofore used to produce such films.

Most of the membranes used in reverse osmosis have been made by casting methods e.g. spin casting, dip casting, doctor blade casting or by standard methods used in conventional polymer chemistry. Many configurations such as sheets, tubes, fibers and the like have been tried but only a small number have been found suitable as hyperfiltration membranes. Most such membranes in commercial use are based on cellulose acetate.

There are many steps involved in casting hyperfiltration membranes and all of these steps play an important part in determining the hyperfiltration performance of the membrane. As a result of the many important steps involved in the casting process many variables must be controlled in order to obtain reproducible and satisfactory membrane performance. For example, if a membrane is cast in an atmosphere of controlled humidity and solvent partial pressure then the hyperfiltration characteristics of the membrane will change depending on the humidity and solvent partial pressures at the time of casting. Also, if a membrane is not cast in a dust free environment membrane imperfections can form which allow salt to pass where dust particles deposit in the cast film. A more difficult variable to control than either dust or atmospheric composition is the thickness of the "skin" or rejecting layer of cast film. The "skin" thickness depends on atmospheric composition, drying time, formulation, and possibly other unknown variables. Furthermore, hyperfiltration membranes formed by casting are prepared from a solution (wet process) and cannot generally be allowed to dry after preparation without shrinking, curling, and irreversibly losing hyperfiltration performance characteristics. Therefore, these cast films must continuously be stored in deionized water. Only a small number of resins have been discovered which can be cast into membranes suitable for reverse osmosis and most of these resins are cellulose based.

In accordance with the present invention the above disadvantages have been obviated. While prior art membranes ordinarily must be kept in constant contact with pure water, the film of the present invention can be stored dry under ordinary room conditions.

Prior art films frequently allow a substantial amount of salt to penetrate through the membrane while the films of the present invention, although only one micron or less in thickness, demonstrate salt rejection rates of 95 percent and higher.

The films that are produced in accordance with the technique of the present invention achieve a maximum density during formation in the apparatus which results in little or no compaction when the film is used in reverse osmosis. Many prior art films compress under use, reducing the throughput of water.

The films of the present invention are formed without pinholes in contrast with many prior art films where small imperfections allow both solute and water to pass.

The film of the present invention has a high adhesion on a variety of substrates and it is easily formed in any desired configuration, so that one is not limited to flat surfaces to support the membrane.

Other advantages of the invention will be brought out in detail in the balance of the specification.

DESCRIPTION OF THE PREFERRED EMBODIMENTS

In accordance with the present invention an unsaturated organic compound is polymerized which has the general formula:

$$CH_2 : CHX$$

wherein $X = -CH_2NH_2, -CH_2OH, -OH, -CH_2OR,$

-OR (wherein R is an alkyl group)

$-CH_2COOH, -COOH, -CH_2C:ONH_2, -C:ONH_2, -CH_2CN$

, 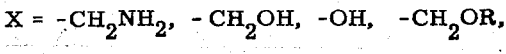

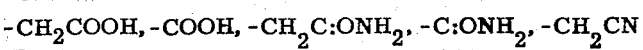
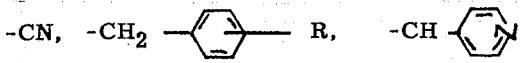

and the like.

As can be seen from the above, unsaturated organic compounds having either an allyl or a vinyl linkage are suitable for carrying out the purpose of the present invention. Preferred compounds for carrying out the invention are allyl amine and diallylamine because of their ready availability and effectiveness. However, it will be understood that any of the compounds described may be polymerized in accordance with the technique of the present invention.

Figure 1:
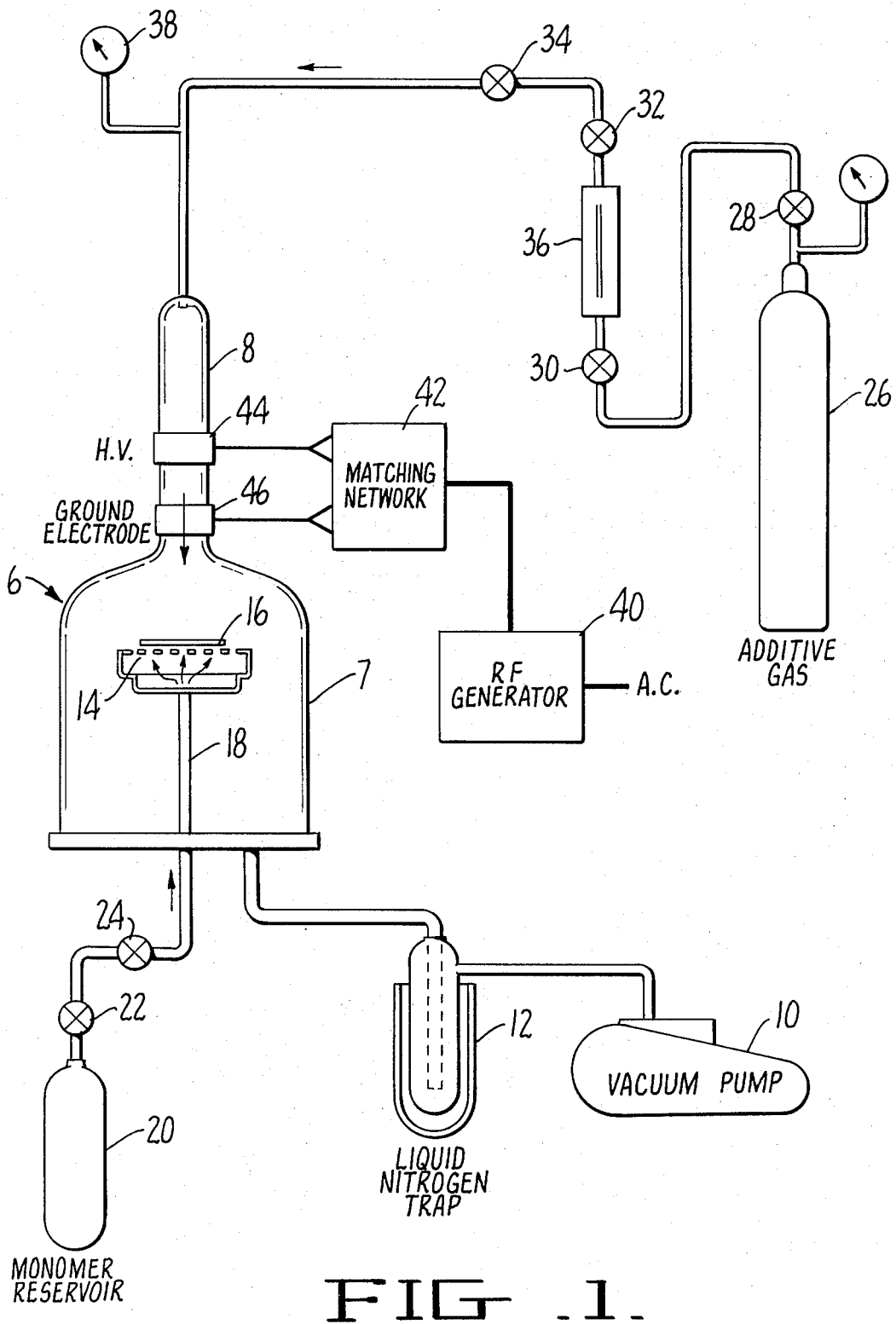
FIG. 1 shows one form of apparatus suitable for carrying out the polymerization of the present invention.

Various forms of apparatus can be used for carrying out the present invention and one suitable form of apparatus is shown in FIG. 1. In this form of apparatus, a bell jar 6 having a body 7 and an elongated neck 8 is employed and this is provided with a vacuum pump 10 and a liquid nitrogen trap 12. Suspended within the body of the bell jar is a grid structure 14 which supports a medium 16, (later described in detail) on which the polymerized film is formed. The grid 14 may be supported by a tube 18 which leads to a tank 20 of the monomer to be polymerized through a shutoff valve 22 and a needle valve 24. Tank 26 is a source of additive gas and is provided with suitable valves 28 and 30, 32 and 34 and a flowmeter 36 for controlling the flow of gas. Pressure in the system can be measured with gauge 38.

In this particular apparatus, an RF generator 40 is employed having an output at 13.56 MHz in the ISM band. The generator had maximum output of about 150 watts. The output from the RF generator is passed through a matching network 42 to a high voltage electrode 44 and a ground potential electrode 46. Electrodes 44 and 46 are outside of the glass neck 8 and provide electrodeless excitation of the plasma.

In this embodiment of the invention the polymer is formed on the support 16 which is preferably a commercial cellulosic porous filter paper having an average porosity of $0.025\mu$ (250A). Other papers having pore sizes as large as $0.1\mu$ (1000A) are suitable. One suitable paper is that manufactured by the Millipore Corporation of Bedford, Massachusetts. This particular filter paper has a shiny side and a dull side and preferably the polymer film is formed on the shiny side of the filter medium since it is in this thin surface region adjacent to the shiny side that the pore size is measured. Obviously any fine grained inert support can be used for the formation of the polymer.

The following non-limiting working examples show various embodiments of the invention.

Degassed allyl amine is provided in the reservoir 20 and the system is pumped down to a vacuum of at least $10^{-3}$ torr. The allyl amine is admitted and valves 22 and 24 adjusted to secure a pressure and flow at a value between 0.05 and 0.3 torr and, if an additive gas is used from source 26, the flow is similarly adjusted to give roughly the same partial pressure so that one ends up with a total system pressure of 0.1 to 0.6 torr. Radio frequency energy from generator 40 is introduced through the matching network 42 unitl a stable discharge or plasma condition is provided between the electrodes. Experiments have shown that there is no criticality within the range of pressure mentioned, namely, 0.05 to 0.3 torr (or 0.1 to 0.6 with additive gas) but the time of deposition to produce a satisfactory membrane will vary depending on the pressure so that at higher pressures, lower deposition times will be required. When the additive gas is employed the polymerization rate appears to be higher than with the pure monomer.

After the discharge power has been increased to a point where the plasma is stable, usually in the range of 30 to 50 watts and with the gases flowing as described, polymerization starts as evidenced first by deposit of polymer around the high voltage electrode. This film may range from light yellow to dark brown in the electrode region. However, the polymerization of interest is that which occurs on the support medium 16 and this polymerization and the deposition occurs shortly after the material is deposited in the vicinity of the high voltage electrode. After the completion of the film, the flow of gases is shut off as well as the RF power. The system is then brought back to atmospheric conditions with no special precautions taken to protect the membrane from ordinary ambient room conditions. In the examples, deposition times vary from about 700 to 4500 seconds.

The membranes thus produced were tested in a standard reverse osmosis test cell manufactured by Universal Water Corporation, Del Mar, California. In this test, the throughput is measured on a 5.08 diameter circular membrane wherein the flux is measured and reported in terms of gallons per square foot per day and also the percentage rejection of sodium chloride and urea. In the following examples, the film had been deposited under 48 watts RF power for 700 seconds on a $0.025\mu$ substrate. The following data were obtained:

Reverse Osmosis Data for
Membranes Prepared at Typical Plasma Conditions

| Example | Additive Gas | Pressure, torr | | Flux | Per Cent Rejection | |
|---|---|---|---|---|---|---|
| | | Monomer | Additive | GFD | NaCl | Urea |
| 1 | Argon | 0.1 | 0.1 | 6.23 | 90.8 | 15.2 |
| 2 | Nitrogen | 0.1 | 0.1 | 4.80 | 88.5 | 15.7 |
| 3 | None (pure Monomer) | 0.1 | 0 | 3.31 | 97.2 | 23.6 |

In the equipment herein described, it was found that the distance between the ground electrode and the support 16 was somewhat critical and that suitable films were formed at from 2 to 6 centimeters spacing. Four centimeters were found to be about optimum. However, this distance is only applicable to this particular rate and RF power level. At other flow rates or power levels, this distance may vary. An important feature of the present invention is that the substrate is oriented perpendicular to the flow of gases and the generation of the plasma. With this orientation a uniform film develops in which the thickness is highly controllable; if the flow of gases and the generation of the plasma were parallel to the substrate on which the film deposits, a severe upstream vs. downstream nonuniformity in film thickness results which can produce uncontrollable or irreproducible membrane performance data in flux and rejection.

The elemental chemical composition of the polymer was analyzed and it was found that the elements were present in the following amounts:

52.9%C
17.4%N
6.9%H

The remainder of 22.8 percent is assumed to be oxygen by difference. Since the original monomer composition of allyl amine is 63 percent C, 25 percent N and 12 percent H, it is obvious that other elements have combined in the polymerized film. The films were also studied by infrared analysis and it was found that there was a new absorption at 2200 cm$^{-1}$ indicating a C ≡ N bond. This result is not expected if conventional (non plasma) organic polymerization reactions were to be predicted and is significant in revealing that the plasma polymerized polymer described in this invention is novel in chemical structure as the result of the unconventional reaction brought about by plasma chemistry.

In carrying out the invention, the additive gas may or may not be present and generally speaking the polymerization goes faster with the additive gas and produces a membrane having a high flux when tested as a reverse osmosis membrane. Any inert gas can be used such as argon, nitrogen, helium or the like.

Figure 2:
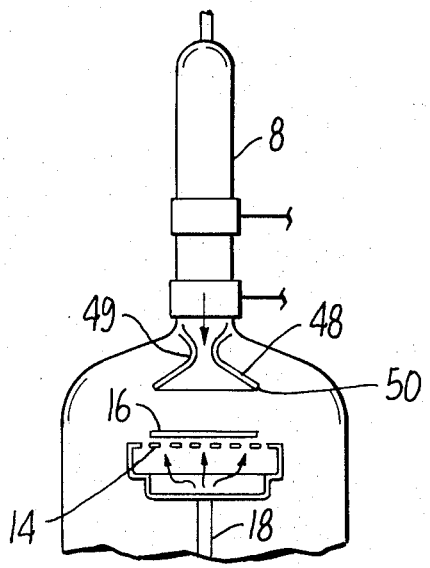
FIG. 2 is a partial view, similar to FIG. 1 showing a modification of the equipment used in FIG. 1.

An improvement in the technique and apparatus of polymerization is shown in FIG. 2. Here an apparatus is exactly as previously described except that a funnel-like projection 48 is provided within the neck of the bell jar and extending into the body of the jar. Funnel 48 has a restricted neck 49 and a diverging section leading to a mouth 50 of approximately the same size as support medium 16 on which the polymer is formed. In using this apparatus, the carrier gas is always employed and this forms a plasma at the electrode as previously described but then encounters the constriction 49 in the funnel-like exit. The diameter at 49 is about 154 inch, reduced from the 2 inch diameter of the neck 8. The net result of this modification is to reduce diffusion of the monomer gas back up into the electrode region. In the apparatus of FIG. 1 this diffusion causes some polymer to form on the glass surface adjacent to and beyond the electrodes. At long deposition times the quantity of polymer becomes great enough to loosen as flakes or particles and descend on the filter support medium. Such particles offer possible membrane imperfection sites and the apparatus of FIG. 2 obviates this problem. The gas expanding out of the orifice 49 is at such a fast velocity that back diffusion of monomer is reduced to a minimum. Thus, the expanding inert gas plasma encounters the monomer primarily at the substrate surface 16 where most of the polymerization takes place. Although there may be some small introduction of polymer in the orifice 49, it is an adherent film and no loose particles fall. Thus, it is preferred to employ the funnel configuration shown in FIG. 2.

Figure 3:
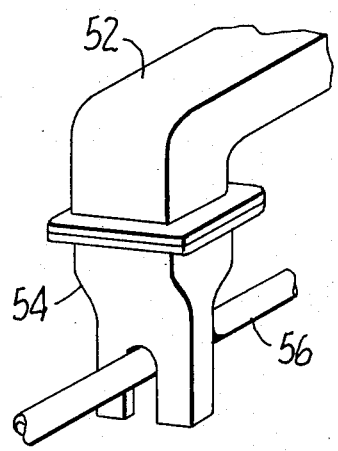
FIG. 3 is a partial diagram showing an alternate polymerization apparatus employing microwave energy.
Figure 4:
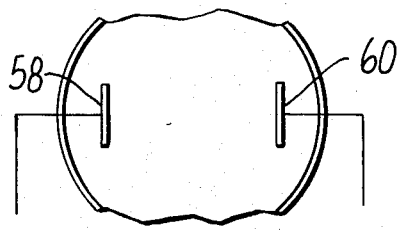
FIG. 4 shows another form of apparatus wherein capacitative coupling is employed.
Figure 5:
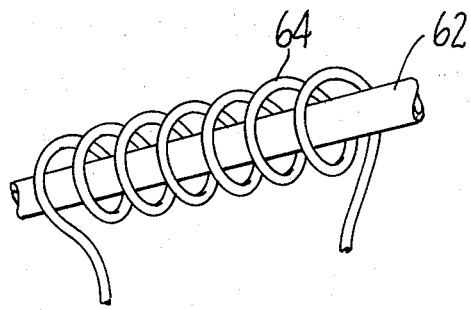
FIG. 5 illustrates still another form of apparatus wherein inductive coupling of high frequency energy is employed.

Although radio frequency electrodeless excitation of the plasma has been described, the plasma can be created in other manners. Typical methods of forming the plasma are shown in FIGS. 3, 4 and 5. In FIG. 3 a waveguide 52 is coupled to a source of microwave energy, not shown, into a cavity 54. The cavity surrounds a discharge flow tube 56 and the polymerization can be caused to take place within the tube. In FIG. 4 a relatively low frequency, such as 50 or 60 Hertz but at a high voltage, excites the electrodes 58 and 60 to form a plasma between the electrodes. In FIG. 5 a reaction tube 62 is inductively coupled to a source of RF energy through a helix 64 wound around the reaction pipe. Thus, various frequencies can be employed with a variety of sub-configurations of the placement of the high voltage and ground electrodes as well as various forms of electrodes such as bands, parallel plates and the like. These examples are merely given as illustrative of the various possibilities.

Although the polymerization has been shown as taking place on a relatively small fixed support at right angles to the path of gas flow, other configurations can naturally be employed. The batch process can be scaled up to produce considerably larger membranes or the membrane can be produced on a continuous basis by the use of a large discharge flow tube diameters with slotted monomer injectors to deposit films on a moving substrate. Further, a plurality of flow tubes capacitively or inductively coupled entering a common reaction chamber in which polymerization and deposition take place simultaneously can also be employed.

We claim:
1. A process for making a reverse osmosis membrane for desalination of water comprising the steps of:
   a. disposing a microporous substrate in an enclosed space,
   b. generating a plasma of an inert gas within said enclosed space,
   c. directing symmetrically a gaseous stream of an unsaturated organic compound including at least one allyl group toward and around said substrate, and
   d. directing the said plasma symmetrically and countercurrently toward said gaseous stream and said substrate, whereby the said unsaturated organic compound is polymerized with the aid of the plasma and deposited on the said substrate as a uniform polymer film to form the reverse osmosis membrane.

2. The process of claim 1 wherein said plasma is created by an electrodeless discharge at a radio frequency.

3. The process of claim 1 wherein the plasma is generated with a microwave generator.

4. The process of claim 1 wherein the unsaturated organic compound is allyl amine.

5. The process of claim 1 wherein the unsaturated organic compound is diallylamine.

6. The process of claim 1 wherein the total gaseous pressure within the enclosed space is maintained between 0.05 and 0.6 torr.

7. The process of claim 1 wherein the distance separating the zone of plasma generation and the substrate is no greater than 6 centimeters.

8. The process of claim 1 wherein the substrate is oriented perpendicular to the flow of gases and the generation of plasma.

9. A process for making a reverse osmosis membrane for desalination of water comprising the steps of:
   a. disposing a microporous substrate in an enclosed space,
   b. generating within said enclosed space a plasma of an unsaturated organic compound including at least one allyl group, and
   c. allowing said plasma to diffuse and surround said substrate and to polymerize and deposit on said substrate as a uniform film to form the reverse osmosis membrane.

10. The process of claim 9 wherein said plasma is created by an electrodeless discharge at a radio frequency.

11. The process of claim 9 wherein the unsaturated organic compound is allyl amine.

* * * * *